United States Patent
Lafler et al.

(10) Patent No.: US 12,410,527 B2
(45) Date of Patent: Sep. 9, 2025

(54) APPARATUS AND RELATED METHODS FOR REDUCING THE AMOUNT OF ATMOSPHERIC CARBON DIOXIDE

(71) Applicant: Ozone Vision, LLC, San Tan Valley, AZ (US)

(72) Inventors: Ryan Lafler, Naperville, IL (US); Elliot Frank Beecham, Bathpool (GB)

(*) Notice: Subject to any disclaimer, the term of this patent is extended or adjusted under 35 U.S.C. 154(b) by 528 days.

(21) Appl. No.: 17/966,848

(22) Filed: Oct. 16, 2022

(65) Prior Publication Data

US 2023/0304165 A1 Sep. 28, 2023

Related U.S. Application Data

(60) Provisional application No. 63/322,608, filed on Mar. 22, 2022.

(51) Int. Cl.
*C25B 1/135* (2021.01)
*B01D 53/32* (2006.01)
(Continued)

(52) U.S. Cl.
CPC .............. *C25B 1/135* (2021.01); *B01D 53/32* (2013.01); *C25B 1/50* (2021.01); *C25B 11/033* (2021.01);
(Continued)

(58) Field of Classification Search
CPC .. C25B 1/01; C25B 1/00; C25B 1/135; C25B 15/08; C25B 11/033
See application file for complete search history.

(56) References Cited

U.S. PATENT DOCUMENTS 9,469,539 B2 10/2016 Chew
9,611,556 B2 4/2017 McCutchen et al.
(Continued)

FOREIGN PATENT DOCUMENTS

CN 113151851 A * 7/2021 ............... C25B 1/00
WO 2022079693 A1 4/2022

OTHER PUBLICATIONS

Machine translation of CN 113151851 of Zhang et al (Year: 2021).*

*Primary Examiner* — Brian W Cohen

(57) ABSTRACT

An apparatus having an air pump configured to take in ambient air and discharge it via an air-pump air-outlet port; the air-pump air-outlet port configured to introduce air into an ambient-air conduit that has a first end and a second end; the ambient-air-conduit first end being fixedly attached to the air-pump air-outlet port; the ambient-air-conduit second end configured to directly or indirectly introduce ambient air into a distribution manifold that has a plurality of distribution-manifold air-outlet ports; at least one metallic ambient-air conduit having a first end and a second end, wherein the first end is fixedly attached to and configured to receive ambient air from a distribution-manifold air-outlet port; the metallic-ambient-air-conduit second end configured to introduce ambient air into an electrified liquid-phase composition having gallium and silver components that reside in a reaction chamber; the reaction chamber being at least partially submerged in an ultrasonic bath that introduces ultrasonic radiation into the reaction chamber; the at least one metallic ambient-air conduit further configured to receive and pass an electrical current into the electrified liquid-phase composition having gallium and silver components; and a conveyor element configured to convey solid-phase carbon-containing reaction products that are received from within the reaction chamber.

10 Claims, 5 Drawing Sheets

(51) Int. Cl.
*C25B 1/50* (2021.01)
*C25B 11/033* (2021.01)
*C25B 15/08* (2006.01)

(52) U.S. Cl.
CPC ........ *C25B 15/08* (2013.01); *B01D 2259/816* (2013.01)

(56) References Cited

U.S. PATENT DOCUMENTS

| | | |
|---|---|---|
| 9,758,881 B2 | 9/2017 | Licht |
| 10,730,751 B2 | 8/2020 | Licht et al. |
| 10,995,000 B2 | 5/2021 | Douglas et al. |
| 11,401,212 B2 | 8/2022 | Licht et al. |
| 2021/0387910 A1 | 12/2021 | Licht et al. |
| 2023/0219068 A1* | 7/2023 | Tang ........................ B01J 35/27 502/230 |
| 2024/0044018 A1* | 2/2024 | Zavabeti ................. C25B 1/135 |

* cited by examiner

APPARATUS AND RELATED METHODS FOR REDUCING THE AMOUNT OF ATMOSPHERIC CARBON DIOXIDE

CROSS-REFERENCE TO RELATED APPLICATIONS

This application claims priority to U.S. provisional patent application Ser. No. 63/322,608 that has a filing date of Mar. 22, 2022. The subject matter of U.S. provisional patent application Ser. No. 63/322,608 is incorporated by reference into this application.

BACKGROUND OF THE INVENTION

Environmental problems associated with carbon-dioxide emissions and the increasing levels of atmospheric carbon dioxide are known. There remains a need to reduce the amount of atmospheric carbon dioxide.

BRIEF SUMMARY OF THE INVENTION

An apparatus having an air pump configured to take in ambient air and discharge it via an air-pump air-outlet port; the air-pump air-outlet port configured to introduce air into an ambient-air conduit that has a first end and a second end; the ambient-air-conduit first end being fixedly attached to the air-pump air-outlet port; the ambient-air-conduit second end configured to directly or indirectly introduce ambient air into a distribution manifold that has a plurality of distribution-manifold air-outlet ports; at least one metallic ambient-air conduit having a first end and a second end, wherein the first end is fixedly attached to and configured to receive ambient air from a distribution-manifold air-outlet port; the metallic-ambient-air-conduit second end configured to introduce ambient air into an electrified liquid-phase composition having gallium and silver components that reside in a reaction chamber; the reaction chamber being at least partially submerged in an ultrasonic bath that introduces ultrasonic radiation into the reaction chamber; the at least one metallic ambient-air conduit further configured to receive and pass an electrical current into the electrified liquid-phase composition having gallium and silver components; and a conveyor element configured to convey solid-phase carbon-containing reaction products that are received from within the reaction chamber.

An apparatus having an air pump configured to take in ambient air and discharge it via an air-pump air-outlet port; the air-pump air-outlet port configured to introduce air into an ambient-air conduit that has a first end and a second end; the ambient-air-conduit first end being fixedly attached to the air-pump air-outlet port; the ambient-air-conduit second end configured to directly or indirectly introduce ambient air into a distribution manifold that has a plurality of distribution-manifold air-outlet ports; at least one metallic ambient-air conduit having a first end and a second end, wherein the first end is fixedly attached to and configured to receive ambient air from a distribution-manifold air-outlet port; the metallic-ambient-air-conduit second end configured to introduce ambient air into an electrified liquid-phase composition having gallium and silver components that reside in a reaction chamber; the reaction chamber being at least partially submerged in an ultrasonic bath that introduces ultrasonic radiation into the reaction chamber; the at least one metallic ambient-air conduit further configured to receive and pass an electrical current into the electrified liquid-phase composition having gallium and silver components; and a conveyor element configured to convey solid-phase carbon-containing reaction products that are received from within the reaction chamber, wherein the solid-phase carbon-containing reaction products are the reaction products of a process having the step of: (i) introducing ambient air into an electrified liquid-phase composition having gallium and silver components.

An apparatus having an air pump configured to take in ambient air and discharge it via an air-pump air-outlet port; the air-pump air-outlet port configured to introduce air into an ambient-air conduit that has a first end and a second end; the ambient-air-conduit first end being fixedly attached to the air-pump air-outlet port; the ambient-air-conduit second end configured to directly or indirectly introduce ambient air into a distribution manifold that has a plurality of distribution-manifold air-outlet ports; at least one metallic ambient-air conduit having a first end and a second end, wherein the first end is fixedly attached to and configured to receive ambient air from a distribution-manifold air-outlet port; the metallic-ambient-air-conduit second end configured to introduce ambient air into an electrified liquid-phase composition having gallium and silver components that reside in a reaction chamber; the reaction chamber being at least partially submerged in an ultrasonic bath that introduces ultrasonic radiation into the reaction chamber; the at least one metallic ambient-air conduit further configured to receive and pass an electrical current into the electrified liquid-phase composition having gallium and silver components; and a conveyor element configured to convey solid-phase carbon-containing reaction products that are received from within the reaction chamber, wherein the solid-phase carbon-containing reaction products are the reaction products of a process having the steps of: (i) introducing ambient air into an electrified liquid-phase composition having gallium and silver components, and (ii) introducing ultrasonic radiation into the electrified liquid-phase composition having gallium and silver components.

BRIEF DESCRIPTION OF THE SEVERAL VIEWS OF THE DRAWING(S)

DETAILED DESCRIPTION OF THE INVENTION

Figure 1:
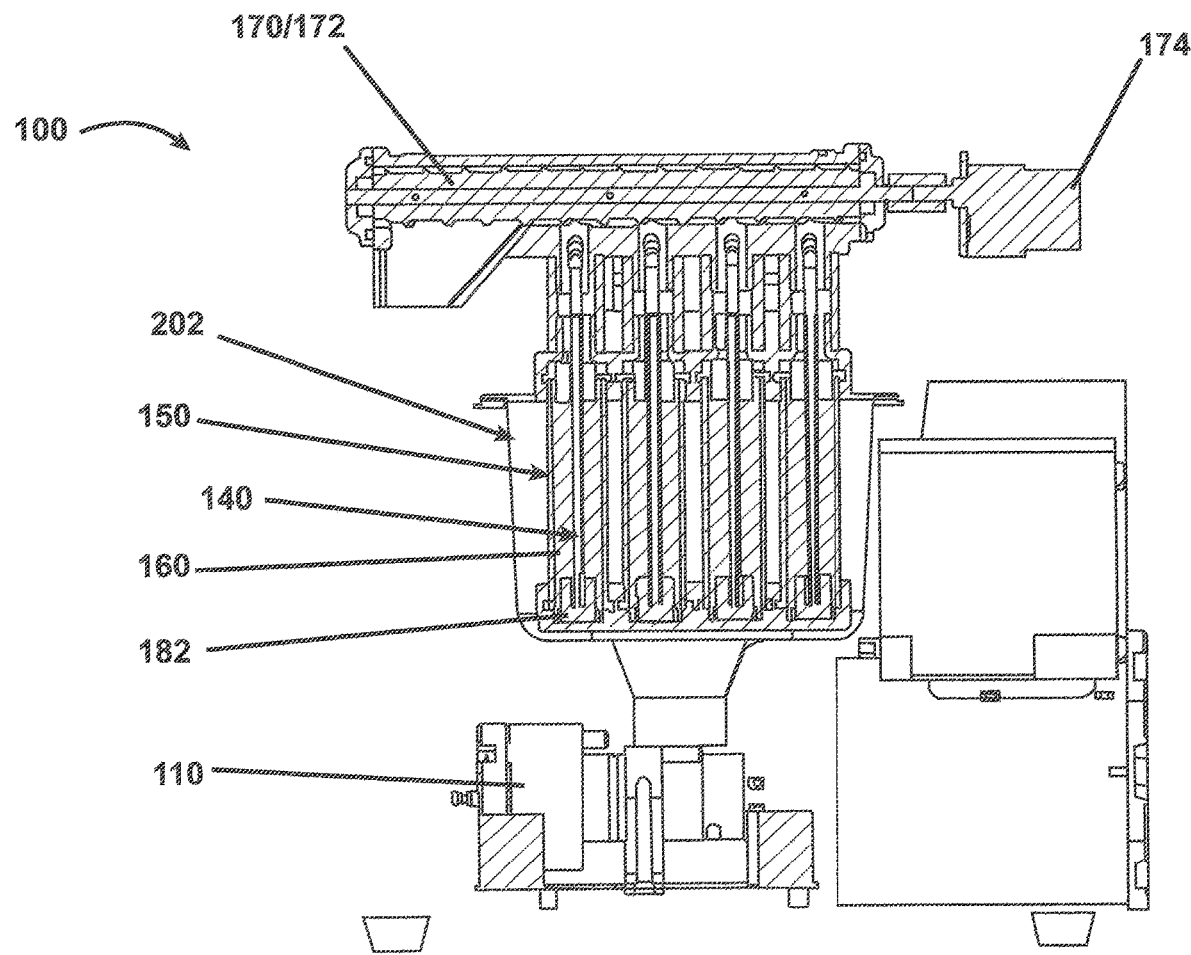
FIG. 1 is a first-side cross-sectional view of an embodiment.
Figure 2:
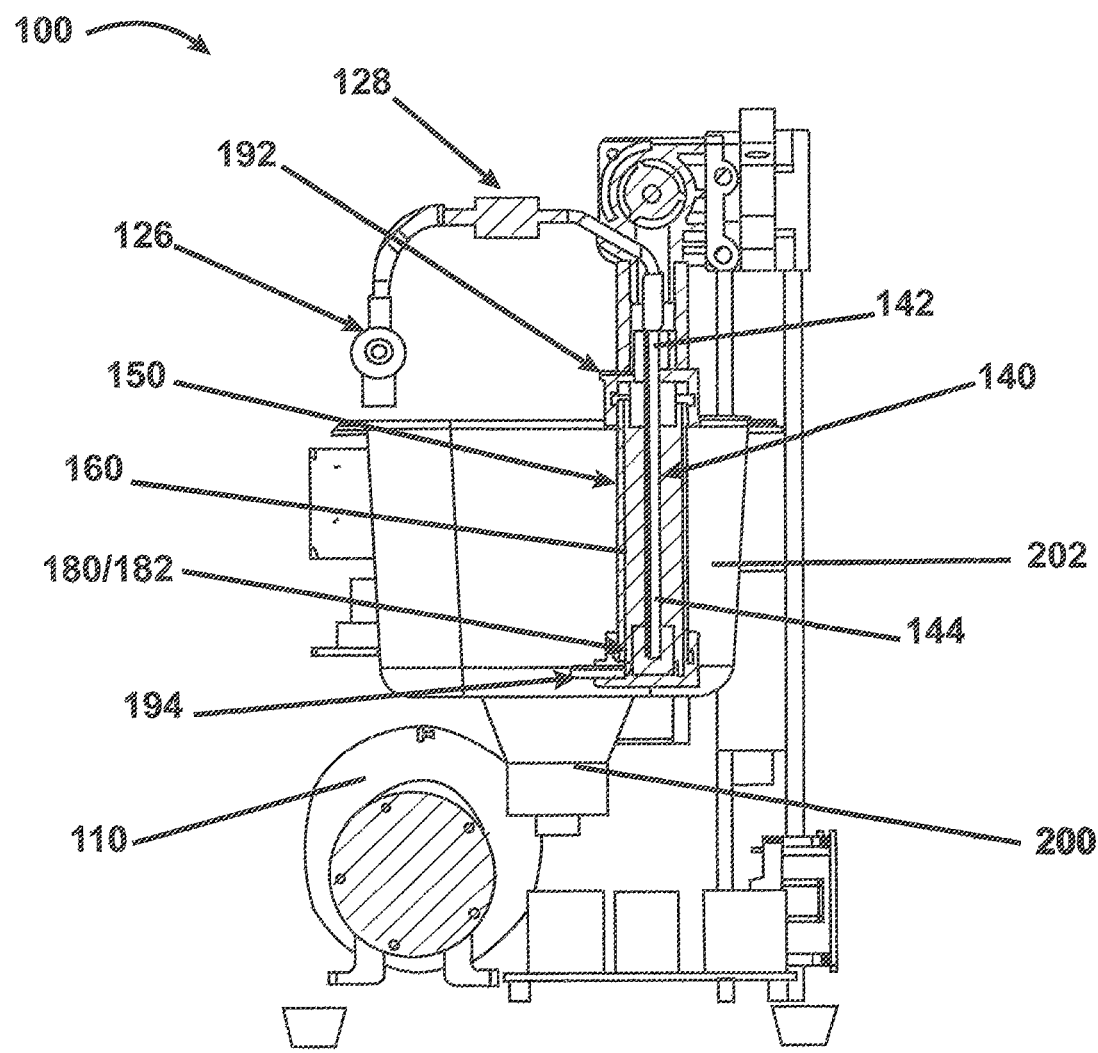
FIG. 2 is a second-side cross-sectional view of an embodiment.
Figure 3:
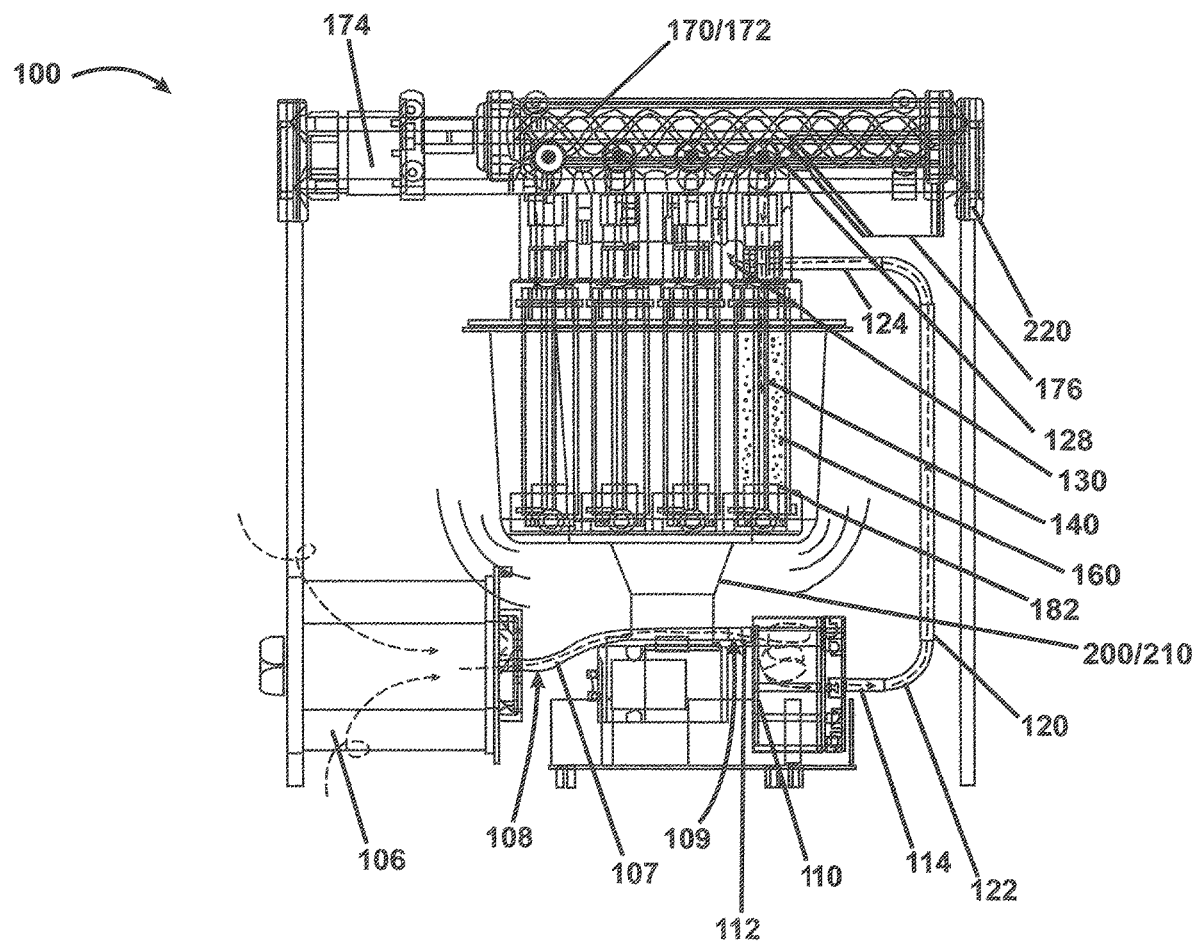
FIG. 3 is a first-end cross-sectional view of an embodiment.
Figure 4:
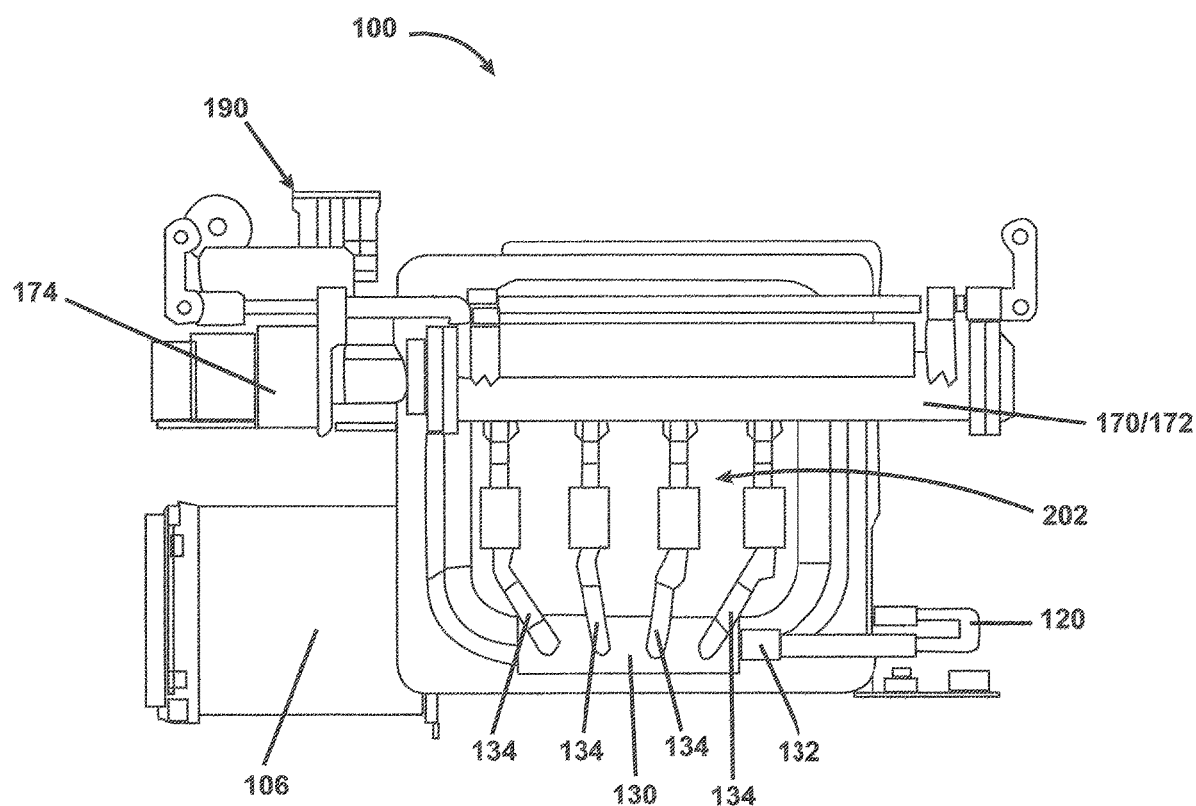
FIG. 4 is a top view of an embodiment.

Embodiments are directed to an apparatus that reduces the amount of carbon dioxide in ambient air by introducing ambient air into an electrified liquid-phase gallium-and-silver-containing composition and thereby causing an electrochemical reaction to occur that reacts gas-phase carbon dioxide and yields a solid-phase carbon-containing reaction product. Very generally, apparatus embodiments are configured to bubble ambient air into an electrified liquid-phase gallium-and-silver-containing composition, and as the ambient air bubbles upwards within the electrified liquid-phase gallium-and-silver-containing composition, an electrochemical reaction occurs that reacts carbon dioxide (which is a component of the ambient air) and subsequently yields a solid-phase carbon-containing reaction product.

Embodiments are described with reference to the figures. Air-inlet filter 106 is fixedly attached to chassis 220 such that as ambient air enters apparatus 100 through air-inlet filter 106, air-inlet filter 106 remains in a fixed position relative to chassis 220 (as ambient air enters into and passes through air-inlet filter 106). As is the case with any air filter, the purpose of air-inlet filter 106 is to filter out solid-phase particles, e.g., dust; this filtering of incoming ambient air helps to ensure that only gas-phase ambient air is subsequently bubbled into electrified liquid-phase gallium-and-silver composition 160.

Filter-to-air-pump conduit 107 has first end 108 and second end 109; filter-to-air-pump-conduit first end 108 receives filtered ambient air from air-inlet filter 106, and filter-to-air-pump conduit 107 then channels filtered ambient air out of filter-to-air-pump-conduit second end 109 and into air pump 110. When activated, air pump 110 creates a vacuum and effectively pulls ambient air through air-inlet filter 106, through filter-to-air-pump conduit 107, and into air pump 110 via air-pump air-intake port 112. Air pump 110 then pushes the filtered ambient air out of air pump 110 via air-pump air-outlet port 114 and into ambient-air-conduit first end 122. Ambient-air conduit 120 has first end 122 and second end 124. Air flow regulator 126 can be used to regulate the filtered-ambient-air flow rate through ambient-air conduit 120 and into distribution manifold 130.

After being pushed through ambient-air conduit 120, filtered ambient air exits ambient-air-conduit second end 124, passes through air check valve 128, and enters distribution manifold 130 via distribution-manifold air-intake port 132. Filtered ambient air is then channeled through distribution manifold 130 and exits distribution manifold 130 via one of the four distribution-manifold air-outlet port(s) 134. As shown in the figures, apparatus 100 has four distribution-manifold air-outlet port(s) 134 that allow filtered ambient air to enter into a metallic ambient-air conduit 140, but other embodiments can include a single distribution manifold air-outlet port 134, or a plurality of distribution manifold air-outlet ports 134 to achieve a desired throughput and/or output production. In the illustrated embodiments, the four metallic ambient-air conduits 140 are described for the sake of brevity and clarity, and can be manufactured from stainless steel or any other suitable metal, metal alloy, polymeric composition or other suitable material that can withstand the reaction conditions described herein.

After exiting any one of the four distribution-manifold air-outlet port(s) 134, filtered ambient air enters a connected metallic ambient-air conduit 140 that has first end 142 and second end 144. This configuration is the same for all four of the distribution-manifold air-outlet port(s) 134, i.e., each of the four distribution-manifold air-outlet port(s) 134 is connected to its own metallic ambient-air conduit 140. And because all four of the distribution-manifold-air-outlet-port-to-metallic-ambient-air-conduit configurations are the same, this explanation is directed to only one of the four configurations and can be understood to apply to all four of them.

Each metallic ambient-air conduit 140 has first end 142 and second end 144. Filtered ambient air exits from distribution-manifold air-outlet port 134 and enters metallic-ambient-air-conduit first end 142. Filtered ambient air is then channeled through metallic ambient-air conduit 140 and out of metallic-ambient-air-conduit second end 144.

After exiting metallic-ambient-air-conduit second end 144, filtered ambient air is then introduced into air-diffusion element 180. In embodiments, air-diffusion element 180 comprises an air stone 182 that increases the surface area of the filtered ambient air per unit volume that is being introduced into liquid-phase composition having gallium and silver components 160. For example, the air stone can be made from lime wood or porous stones and distribute a first, continuous volume of air through a plurality of separate pores, thereby breaking up the first volume of air that would otherwise form a relatively large air bubble into a plurality of separate, relatively-small air bubbles in the liquid-phase composition having gallium and silver components 160. Absent air-diffusion element 180/182, filtered ambient air would exit metallic-ambient-air-conduit second end 144 as relatively large bubbles having relatively lower surface area per unit volume of filtered ambient air (relative to the surface area of filtered ambient air exiting metallic-ambient-air-conduit second end 144 through air-diffusion element 180/182) in electrified liquid-phase composition having gallium and silver components 160; but because air-diffusion element 180/182 creates a plurality of smaller bubbles (per unit volume of filtered ambient air) in electrified liquid-phase composition having gallium and silver components 160, the surface area per unit volume of filtered ambient air is increased (relative to the surface area of filtered ambient air exiting metallic-ambient-air-conduit second end 144 without the use of air-diffusion element 180/182).

The result of the relatively increased surface area of filtered ambient air is that the number of chemical reactions increases proportionally as the surface area per unit volume of filtered ambient air increases; this is because the electrochemical reactions (wherein carbon dioxide is a reactant) at least occur at a filtered-ambient-air bubble's surface that is in contact with electrified liquid-phase composition having gallium and silver components 160.

As will be appreciated by persons of ordinary skill in the art, in the above-described filtered-ambient-air fluid-flow path within apparatus 100, the connections between the air-flow mechanical elements are airtight to ensure that filtered ambient air does not escape from the filtered-ambient-air fluid-flow path as it travels from air inlet filter 106 to air diffusion element 180, e.g., air stone 182. The airtight connections ensure apparatus 100's gas-phase fluid flow operational efficiency.

As shown in the figures, all four reaction chambers 150 are partially submerged in ultrasonic bath 202; in embodiments, the fluid that makes up ultrasonic bath 202 is water. This partially submerged reaction-chamber configuration allows electrified liquid-phase composition having gallium and silver components 160, which is in the ultra-sonic-bath submerged portion of each reaction chamber 150, to receive ultrasonic radiation from the surrounding ultrasonic bath 202. With reference to the figures, the longitudinal length of each reaction chamber 150 extends upwardly from the bottom of ultrasonic bath 202, through the surface of ultrasonic bath 202, and out of the ultrasonic-bath surface to a height that reaches conveyor element 170. This is portrayed in the FIGS. as approximately half of the longitudinal length of each reaction chamber 150 being submerged in ultrasonic bath 202 (where electrified liquid-phase composition having gallium and silver components 160 resides within each reaction chamber 150), and the remaining non-submerged longitudinal-length portions of each reaction chamber 150 extends upwardly out of ultrasonic bath 202 to conveyor element 170.

The interior portions of each reaction chamber 150 that extend upwardly and out of ultrasonic bath 202 serve to collect the carbon-containing solid-phase reaction products from the surface of electrified liquid-phase composition having gallium and silver components 160. As the quantity of carbon-containing solid-phase reaction products increases within reaction chamber 150, the walls of reaction chamber 150 guide and channel the increasing amount of carbon-containing solid-phase reaction products to conveyor element 170.

This submerged-in-ultrasonic-bath reaction-chamber configuration causes ultrasonic radiation emitted by ultrasonic-radiation transducer/generator 200 to pass into and throughout ultrasonic bath 202, through the walls of all four reaction chambers 150, and throughout electrified liquid-phase composition having gallium and silver components 160. In embodiments, the walls of reaction chamber 150 are made of glass. In other embodiments, the walls of reaction chamber 150 can be manufactured from a variety of materials, and persons of ordinary skill in the art will be able to determine useful reaction-chamber manufacturing materials without having to exercise undue experimentation.

Heating element 210 heats ultrasonic bath 202, which in turn, heats all four reaction chambers 150 and their contents 160, i.e., electrified liquid-phase composition having gallium and silver components 160. In embodiments, electrified liquid-phase composition having gallium and silver components 160 is heated to at least 30° Celsius. Persons of ordinary skill in the art will appreciate that any temperature can be used that causes electrified composition having gallium and silver components 160 to consistently be in the liquid phase during operation of apparatus 100.

In embodiments, electrified composition having gallium and silver components 160 is 1% to 20% by weight of silver and 80% to 99% by weight of gallium. In other embodiments, electrified composition having gallium and silver components 160 is 5% to 15% by weight of silver and 85% to 95% by weight of gallium. In still other embodiments, electrified composition having gallium and silver components 160 is about 10% by weight of silver and about 90% by weight of gallium. Persons of ordinary skill in the art will appreciate that other useful amounts of gallium and silver components (that make up electrified composition having gallium and silver components 160) can be determined without having to exercise undue experimentation.

All four metallic ambient-air conduits 140 are configured to pass an electric current through the length of each respective metallic ambient-air conduit 140. In embodiments, each metallic-ambient-air-conduit first end 142 has a negative electrode attached to metallic-ambient-air-conduit first end 142, and the base of each reaction chamber 150 is either grounded or attached to a positive electrode—thereby allowing electrical current to pass through electrified liquid-phase composition having gallium and silver components 160. The electrical current can be selectively conducted through each of the metallic ambient-air conduit 140 according to a desired control routine. For example, the conduction of the electric current through each of the metallic ambient-air conduits 140 can optionally be independently controlled by suitable switching circuits that are opened and closed under the control of switch control logic 258 of a controller 190 described with reference to FIG. 5, below. By passing an electrical current through each respective metallic ambient-air conduit 140, electrified liquid-phase composition having gallium and silver components 160 also receives the electrical current and is thereby electrified—which facilitates an electrochemical reaction of gas-phase carbon dioxide to yield a solid phase carbon-containing reaction product.

The electrochemical reaction of carbon-dioxide reactants yields carbon-containing solid-phase reaction products directly into electrified liquid-phase composition having gallium and silver components 160. Due to the specific-gravity differential between carbon-containing solid-phase reaction products and that of electrified liquid-phase composition having gallium and silver components 160, carbon-containing solid-phase reaction products are forced to the surface of electrified liquid-phase composition having gallium and silver components 160. It is above the surface of electrified liquid-phase composition having gallium and silver components 160 and within the portion of reaction chamber 150 that extends to conveyor element 170 that solid-phase carbon-containing reaction products collect and accumulate. During operation of apparatus 100, and over time, newly created carbon-containing solid-phase reaction products are pushed to the surface of electrified liquid-phase composition having gallium and silver components 160, and in doing so, these relatively new carbon-containing solid-phase reaction products displace pre-existing solid-phase carbon-containing reaction products that are already at the surface of electrified liquid-phase composition having gallium and silver components 160. As relatively new reaction products continue to be yielded, the pre-existing solid-phase reaction products that are already at the surface of electrified liquid-phase composition having gallium and silver components 160 are displaced in an upwardly fashion (within reaction chamber 150) and to such an extent that over time, as apparatus 100 continues to operate, the solid-phase carbon-containing reaction products effectively pile up in an upwardly fashion within reaction chamber 150 to such an extent that the top of the reaction-product pile reaches conveyor element 170. In embodiments, conveyor element 170 is an Archimedes screw that receives the upwardly driven solid-phase carbon-containing reaction products and conveys them to collection chamber 176.

Archimedes screw 172 is driven by conveyor motor 174, and Archimedes screw 172 is fixedly attached to chassis 220.

A controller 190 can be coupled to, or otherwise operatively connected to a portion of the apparatus 100 to control operation of the various components to produce the solid-phase carbon-containing reaction products as described herein. As shown schematically in FIG. 5, an embodiment of the controller 190 can be configured as a computing system comprising electronic processing circuitry 192 operatively connected to one, or a plurality of: the air pump 110, the ultrasonic-radiation transducer/generator 200, the heating element 210, and the conveyor motor 174 to control operation of the respective components. Operation of the one or more components by the controller 190 can be responsive to sensed conditions within the apparatus 100 such as a measured airflow, measured temperature, sensed operational state of a component of the apparatus 100, a manually-input user setting, or any other desired parameter.

For example, embodiments of the controller 190 can include air pump control logic 194 that executes a control routine to activate, deactivate, or modulate an operational speed of the air pump 110 to achieve a desired airflow of ambient air into the apparatus 100.

Transducer/generator logic 196 provided to the controller 190 executes a control routine to activate, deactivate or modulate operation of the ultrasonic-radiation transducer/generator 200 to emit ultrasonic radiation suitable to stimulate the reactions described herein. Thermal logic 198 provided to the controller 190 executes a control routine to activate, deactivate or modulate operation of the heating element 210 to maintain a temperature of the ultrasonic bath 202 at the desired reaction temperatures described herein. Conveyance logic 240 provided to the controller 190 executes a control routine to activate, deactivate or modulate operation of the conveyor element 170, specifically the conveyor motor 174, to transport the solid, carbon-containing reaction products to a receptacle or other storage container as described herein. And switch control logic 258 of the controller 190 can execute a control routine to open and close a circuit and selectively conduct electric current through the metallic ambient-air conduits 140 as described herein.

Figure 5:
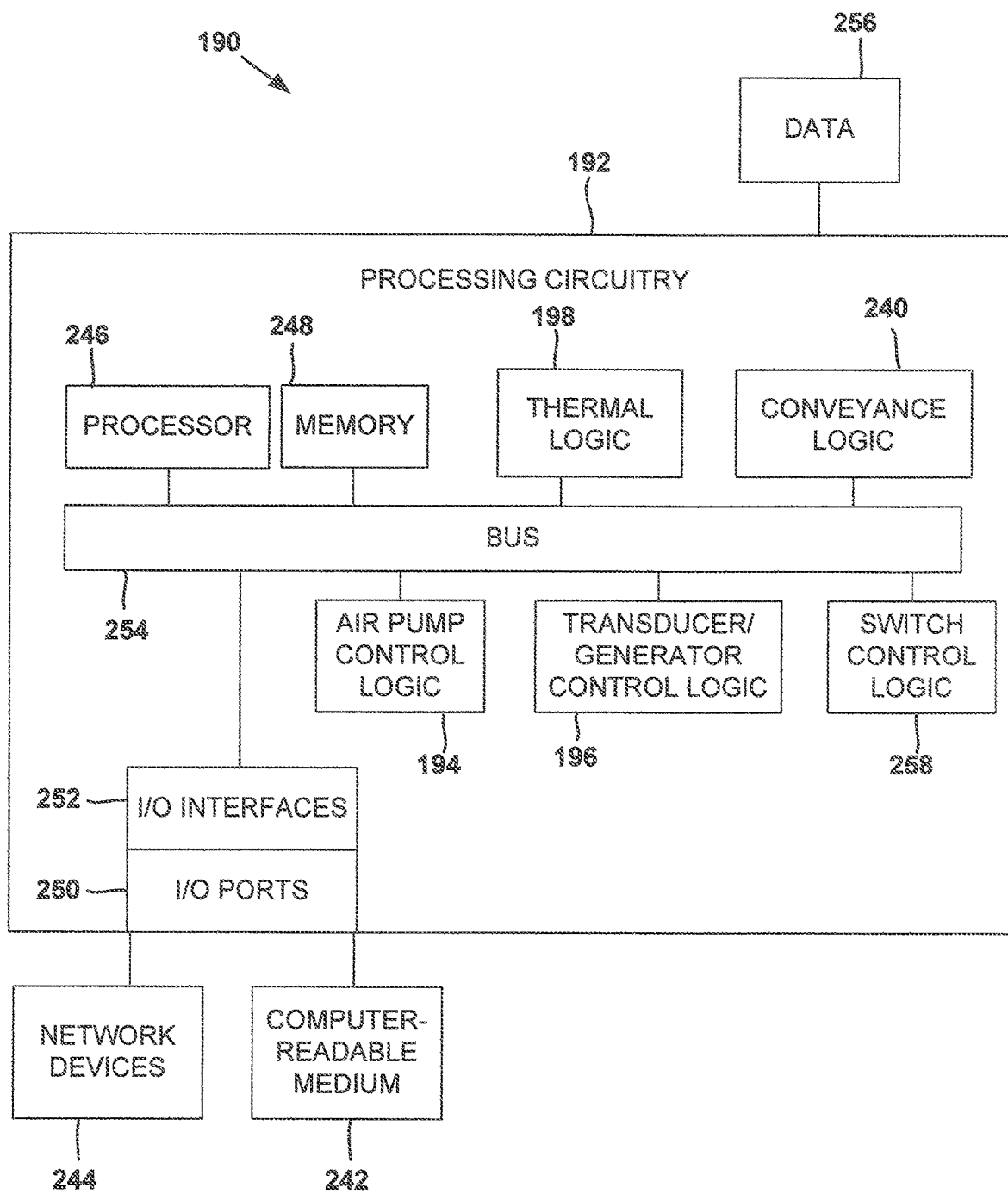
FIG. 5 is an embodiment of a controller comprising electronic processing circuitry and a non-transitory, computer-readable medium storing executable logic that, when executed, operates portions of the apparatus to produce the solid, carbon-containing reaction product as described herein.

The computing system of the embodiment in FIG. 5 is configured and/or programmed with one or more of the exemplary systems and methods described herein, and/or equivalents. As shown, the processing circuitry 192 is responsive to input instructions corresponding to operational states of the apparatus 100, or manually-input or pre-programmed operational instructions. For example, the instructions can be included as a data structure pre-programmed and stored in a non-transitory, computer-readable medium 242 such as a SD card, hard disk drive, etc. According to other embodiments, the instructions can be manually input by an operator during operation of the apparatus 100 via a network device 244 such as a user interface or wireless/wired network connection. According to yet other embodiments, the instructions can correspond to, or be based on control signals transmitted by an automated network device 244 such as one or more sensors to be received by the processing circuitry 702. Of course, the instruction embodiments can include a plurality of the foregoing examples.

The processing circuitry 192 can include a computer processor 246, an integrated memory 248, and input/output ports 250 controlled by an input/output (I/O) interface 252 operably connected by a data bus 254. Examples of the processor 246 include, but are not limited to, single or multi-processor microprocessor architectures.

The air pump logic 194, transducer/generator control logic 196, the thermal logic 198, the conveyance logic 240, or any combination thereof, may be implemented in hardware, a computer-readable medium with stored instructions that are executable by the processor 246, firmware, and/or combinations thereof. While the air pump logic 194, transducer/generator control logic 196, the thermal logic 198, and the conveyance logic 240 are illustrated as a hardware components in communication with the data bus 254, it is to be appreciated that in other embodiments, the air pump logic 194, transducer/generator control logic 196, the thermal logic 198, the conveyance logic 240 could be implemented in the processor 246, stored in memory 248, or stored in the remote computer-readable medium 242 or other electronic storage device that is separate from, but operatively connected to the processing circuitry 192. For embodiments including the remote computer-readable medium 242, the computer-readable medium 242 may be operably connected to the processing circuitry 192 via, for example, the input/output (I/O) interface 252, which includes one or more of the input/output ports 250 (e.g., SD card slot, disc drive, USB port, etc.).

The processing circuitry 192 described above can be integrated with, and form a portion of the apparatus 100, coupled to the apparatus 100 and protected within a weather resistant case, etc. As another example, the air pump logic 194, transducer/generator control logic 196, the thermal logic 198, the conveyance logic 240 can constitute a means (e.g., structure: hardware; non-transitory, computer-readable medium; firmware; etc.) for performing the actions described herein that is remotely located, but operatively connected to the apparatus 100 via a suitable communication channel (e.g., any wireless or hard-wired channel). Examples of such embodiments include, but are not limited to processing circuitry 192 configured as a server or other terminal operating in a cloud computing system, such as a smartphone, laptop, desktop, tablet computing device, and so on, that remotely transmits control instructions to the air pump logic 194, transducer/generator control logic 196, the thermal logic 198, the conveyance logic 240. Such means may be implemented, for example, as an application-specific integrated circuit ("ASIC"), programmed to receive instructions for controlling the air pump 110, the ultrasonic-radiation transducer/generator 200, the heating element 210, and the conveyor motor 174 to control operation of the respective components. As another example, the means may also be implemented as stored computer-executable instructions that are presented to processing circuitry 192 as data 256 from a remote source over a communication network, that are temporarily stored in memory 248 and then executed by processor 246. Examples of the communication network include, but are not limited to, a local area network ("LAN"), a wide area network ("WAN"), and other networks.

The processing circuitry 192 may interact with one or more of the network devices 244 via the I/O interfaces 252 and the input/output ports 254. Input/output devices may be, for example, any type of user interface that allows an operator to input a command for controlling operation of any of the components of the apparatus 100. According to some embodiments, examples of the network devices 244 include, but are not limited to, a keyboard, a microphone, a pointing and selection device, joystick, touch-sensitive display, and so on. The input/output ports 254 may include, for example, serial ports, parallel ports, USB ports, wireless communication channels (e.g., Bluetooth radios, IEEE 802.1x compliant radios, etc).

In one or more embodiments, the disclosed methods or their equivalents are performed by either: computer hardware configured to perform the method; or computer instructions embodied in a module stored on the computer-readable medium 242 where the instructions are configured as an executable algorithm configured to perform the present processes when executed by at least the processor 246 of the processing circuitry 192.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment," "an embodiment," "one example," "an example," and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

A "data structure," as used herein, is an organization of data in a computing system that is stored in a memory, a storage device, or other computerized system. A data structure may be any one of, for example, a data field, a data file, a data array, a data record, a database, a data table, a graph, a tree, a linked list, and so on. A data structure may be formed from, and contain many other data structures (e.g., a database includes many data records). Other examples of data structures are possible as well, in accordance with other embodiments.

"Computer-readable medium" and "memory," as used herein, refer to a non-transitory medium that stores instructions and/or data configured to perform one or more of the disclosed functions when executed by at least the processor 246. Data 256 may function as instructions in some embodiments. A computer-readable medium 242 and memory 248 may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium 242 and memory 248 may include, but are not limited to, a floppy disk, a flexible disk, a hard disk, a magnetic tape, other magnetic medium, an ASIC, a programmable logic device, a compact disk (CD), other optical medium, a random access memory (RAM), a read-only memory (ROM), a memory chip or card, a memory stick, solid-state storage device (SSD), flash drive, and other media from which a computer, a processor or other electronic device can retrieve and store data and/or instructions. Each type of media, if selected for implementation in one embodiment, may include stored instructions of an algorithm configured to perform one or more of the disclosed and/or claimed functions.

"Logic," as used herein, represents a component that is implemented with computer or electrical hardware (e.g., computer-readable medium 706 and/or memory 716), a non-transitory medium with stored instructions of an executable application or program module, and/or combinations of these to perform any of the functions or actions as disclosed herein, and/or to cause a function or action from another logic, method, and/or system to be performed as disclosed herein. Equivalent logic may include firmware, a microprocessor programmed with an algorithm, a discrete logic (e.g., ASIC), at least one circuit, an analog circuit, a digital circuit, a programmed logic device, a memory device containing instructions of an algorithm, and so on, any of which may be configured to perform one or more of the disclosed functions. In one embodiment, logic may include one or more gates, combinations of gates, or other circuit components configured to perform one or more of the disclosed functions. Where multiple logics are described, it may be possible to incorporate the multiple logics into one logic. Similarly, where a single logic is described, it may be possible to distribute that single logic between multiple logics. In one embodiment, one or more of these logics are corresponding structure associated with performing the disclosed and/or claimed functions. Choice of which type of logic to implement may be based on desired system conditions or specifications. For example, if greater speed is a consideration, then hardware would be selected to implement functions. If a lower cost is a consideration, then stored instructions/executable application would be selected to implement the functions.

An "operable connection," or a connection by which entities are "operably connected," is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, non-transitory computer-readable medium). Logical and/or physical communication channels can be used to create an operable connection.

While the disclosed embodiments have been illustrated and described in considerable detail, it is not the intention to restrict or in any way limit the scope of the appended claims to such detail. It is, of course, not possible to describe every conceivable combination of components or methodologies for purposes of describing the various aspects of the subject matter. Therefore, the disclosure is not limited to the specific details or the illustrative examples shown and described.

What is claimed is:

1. An apparatus comprising:
   an air pump configured to take in ambient air and discharge it via an air-pump air-outlet port;
   the air-pump air-outlet port configured to introduce air into an ambient-air conduit that has a first end and a second end;
   the ambient-air-conduit first end being fixedly attached to the air-pump air-outlet port;
   the ambient-air-conduit second end configured to directly or indirectly introduce ambient air into a distribution manifold that has a plurality of distribution-manifold air-outlet ports;
   at least one metallic ambient-air conduit having a first end and a second end, wherein the first end is fixedly attached to and configured to receive ambient air from a distribution-manifold air-outlet port;
   the metallic-ambient-air-conduit second end configured to introduce ambient air into an electrified liquid-phase composition having gallium and silver components that reside in a reaction chamber;
   the reaction chamber being at least partially submerged in an ultrasonic bath that introduces ultrasonic radiation into the reaction chamber;
   the at least one metallic ambient-air conduit further configured to receive and pass an electrical current into the electrified liquid-phase composition having gallium and silver components; and
   a conveyor element configured to convey solid-phase carbon-containing reaction products that are received from within the reaction chamber.

2. The apparatus of claim 1, wherein the solid-phase carbon-containing reaction products are the reaction products of a process having the step of:
   (i) introducing ambient air into an electrified liquid-phase composition having gallium and silver components.

3. The apparatus of claim 2, wherein the process further comprises the step of:
   (ii) introducing ultrasonic radiation into the electrified liquid-phase composition having gallium and silver components.

4. The apparatus of claim 3, wherein the liquid-phase composition is maintained at a temperature of at least 30° Celsius.

5. The apparatus of claim 1, further comprising an air-diffusion element that is fixedly attached to the metallic-ambient-air-conduit second end.

6. The apparatus of claim 5, wherein the air-diffusion element is an air stone.

7. The apparatus of claim 1, wherein the conveyor element is an Archimedes screw.

8. The apparatus of claim 1, wherein the reaction chamber is configured to channel solid-phase carbon-containing reaction products from a surface of the electrified liquid-phase composition having gallium and silver components to the conveyor element.

9. An apparatus comprising:
an air pump configured to take in ambient air and discharge it via an air-pump air-outlet port;
the air-pump air-outlet port configured to introduce air into an ambient-air conduit that has a first end and a second end;
the ambient-air-conduit first end being fixedly attached to the air-pump air-outlet port;
the ambient-air-conduit second end configured to directly or indirectly introduce ambient air into a distribution manifold that has a plurality of distribution-manifold air-outlet ports;
at least one metallic ambient-air conduit having a first end and a second end, wherein the first end is fixedly attached to and configured to receive ambient air from a distribution-manifold air-outlet port;
the metallic-ambient-air-conduit second end configured to introduce ambient air into an electrified liquid-phase composition having gallium and silver components that reside in a reaction chamber;
the reaction chamber being at least partially submerged in an ultrasonic bath that introduces ultrasonic radiation into the reaction chamber;
the at least one metallic ambient-air conduit further configured to receive and pass an electrical current into the electrified liquid-phase composition having gallium and silver components; and
a conveyor element configured to convey solid-phase carbon-containing reaction products that are received from within the reaction chamber, wherein the solid-phase carbon-containing reaction products are the reaction products of a process having the step of:
(i) introducing ambient air into an electrified liquid-phase composition having gallium and silver components.

10. An apparatus comprising:
an air pump configured to take in ambient air and discharge it via an air-pump air-outlet port;
the air-pump air-outlet port configured to introduce air into an ambient-air conduit that has a first end and a second end;
the ambient-air-conduit first end being fixedly attached to the air-pump air-outlet port;
the ambient-air-conduit second end configured to directly or indirectly introduce ambient air into a distribution manifold that has a plurality of distribution-manifold air-outlet ports;
at least one metallic ambient-air conduit having a first end and a second end, wherein the first end is fixedly attached to and configured to receive ambient air from a distribution-manifold air-outlet port;
the metallic-ambient-air-conduit second end configured to introduce ambient air into an electrified liquid-phase composition having gallium and silver components that reside in a reaction chamber;
the reaction chamber being at least partially submerged in an ultrasonic bath that introduces ultrasonic radiation into the reaction chamber;
the at least one metallic ambient-air conduit further configured to receive and pass an electrical current into the electrified liquid-phase composition having gallium and silver components; and
a conveyor element configured to convey solid-phase carbon-containing reaction products that are received from within the reaction chamber, wherein the solid-phase carbon-containing reaction products are the reaction products of a process having the steps of:
(i) introducing ambient air into an electrified liquid-phase composition having gallium and silver components, and
(ii) introducing ultrasonic radiation into the electrified liquid-phase composition having gallium and silver components.

\* \* \* \* \*